(12) United States Patent
Kloos et al.

(10) Patent No.: US 12,460,783 B2
(45) Date of Patent: Nov. 4, 2025

(54) HEADLAMP FOR VEHICLES

(71) Applicant: HELLA GMBH & CO. KGAA, Lippstadt (DE)

(72) Inventors: Gerhard Kloos, Erwitte (DE); Philip Stroop, Schloß Holte-Stukenbrock (DE); Benjamin Willeke, Paderborn (DE); Rimma Zhytnytska, Lippstadt (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 18/883,017

(22) Filed: Sep. 12, 2024

(65) Prior Publication Data

US 2025/0084975 A1    Mar. 13, 2025

(30) Foreign Application Priority Data

Sep. 12, 2023   (DE) .......................... 102023124550.3

(51) Int. Cl.
| | |
|---|---|
| *F21S 41/265* | (2018.01) |
| *F21S 41/143* | (2018.01) |
| *F21S 41/20* | (2018.01) |
| *F21S 41/25* | (2018.01) |
| *F21S 41/255* | (2018.01) |
| *F21S 41/26* | (2018.01) |
| *F21S 41/27* | (2018.01) |

(Continued)

(52) U.S. Cl.
CPC ........... *F21S 41/265* (2018.01); *F21S 41/143* (2018.01); *F21S 41/25* (2018.01); *F21S 41/255* (2018.01); *F21S 41/26* (2018.01); *F21S 41/27* (2018.01); *F21S 41/275* (2018.01); *F21S 41/285* (2018.01); *F21V 5/045* (2013.01); *F21W 2102/18* (2018.01)

(58) Field of Classification Search
CPC .......... F21S 41/25; F21S 41/255; F21S 41/26; F21S 41/265; F21S 41/27; F21S 41/275; F21S 41/285; F21V 5/045; F21W 2102/18

See application file for complete search history.

(56) References Cited

U.S. PATENT DOCUMENTS

| | | | |
|---|---|---|---|
| 2011/0205748 A1* | 8/2011 | Yatsuda | F21S 41/147 362/338 |
| 2016/0363288 A1* | 12/2016 | McKendry | F21V 5/008 |
| 2019/0079217 A1 | 3/2019 | De Lamberterie et al. | |

FOREIGN PATENT DOCUMENTS

| | | |
|---|---|---|
| DE | 102020126935 A1 | 4/2022 |
| DE | 102021113426 A1 | 12/2022 |

(Continued)

*Primary Examiner* — Colin J Cattanach
(74) *Attorney, Agent, or Firm* — WARNER NORCROSS + JUDD LLP

(57) ABSTRACT

The invention relates to a headlamp for vehicles with a light source for emitting a light beam and with an optical unit containing a projection lens which deflects a first part of the light beam for generation of a light distribution with a light/dark boundary. A second part of the light beam emitted by the light source is guided in an area above the light/dark boundary of the light distribution for detection of high-mounted traffic signs. The projection lens is configured as a Fresnel lens which comprises arch-shaped first usable edges in an upper half space and in a lower half space for deflection of the first part of the light beam, and which comprises a number of arch-shaped second usable edges exclusively in the upper half space for passage of the second part of the light beam therethrough.

14 Claims, 2 Drawing Sheets

(51) Int. Cl.
*F21S 41/275* (2018.01)
*F21V 5/04* (2006.01)
*F21W 102/18* (2018.01)

(56) References Cited

FOREIGN PATENT DOCUMENTS

DE 102022124020 A1 3/2024
DE 102022126304 A1 4/2024

* cited by examiner

HEADLAMP FOR VEHICLES

CROSS-REFERENCE TO RELATED APPLICATIONS

The present application claims the benefit of German Patent Application No. 10-2023-124-550.3, filed Sep. 12, 2023, the disclosure of which is incorporated by reference.

FIELD OF THE INVENTION

The invention relates to a headlamp for vehicles with a light source for emitting a light beam and with an optical unit containing a projection lens which deflects a first part of the light beam for generation of a light distribution with a light/dark boundary, wherein the optical unit comprises means so that a second part of the light beam emitted by the light source is guided in an area above the light/dark boundary of the light distribution for detection of high-mounted traffic signs.

BACKGROUND OF THE INVENTION

A headlamp for vehicles which comprises a light source and an optical unit for generation of a predetermined light distribution with a light/dark boundary and for detecting high-mounted traffic signs (overhead traffic signs) is known from DE 10-2020-126-935. The optical unit usually comprises at least one lens that has an additional notch so that lighting levels can be generated for detectability of the overhead traffic signs at a specified lighting location. In order to avoid such a notch, which is undesirable both optically and for design reasons, the known headlamp has an LED matrix array of light sources, wherein the lighting levels for the overhead traffic signs are achieved by pulse width control of the light sources.

A headlamp for vehicles which comprises a light source and an optical unit containing a projection lens for generation of a predetermined light distribution with a light/dark boundary as well as a light component guided above the light/dark boundary for detectability of overhead traffic signs is known from DE 10-2021-113-426. In order that the projection lens does not need to comprise an additional notch, light reflected back from the projection lens is reflected forwards by a primary lens assigned to the light source in such a way that this light component can be used for detectability of high-mounted traffic signs (overhead traffic signs). A disadvantage of the known headlamp is that the projection lens must have a reflective coating, which is undesirable for design reasons.

SUMMARY OF THE INVENTION

The task of the present invention is therefore to further develop a headlamp for vehicles with a light source and an optical unit containing a projection lens in such a way that, in a simple manner, a light distribution with a light/dark boundary closing off the light distribution at the top and compliance with lighting levels for detectability of high-mounted traffic signs (overhead traffic signs) is ensured.

To solve this task, the projection lens is configured as a Fresnel lens which comprises arch-shaped first usable edges in an upper half space and in a lower half space for deflection of the first part of the light beam, and which exclusively comprises a number of arch-shaped second usable edges in the upper half space, by means of which second usable edges the second part of the light beam passes through.

The particular advantage of the invention is that no additional notch, groove or indentation must be incorporated in the projection lens. According to the invention, the projection lens is configured as a Fresnel lens with a Fresnel structure which consists of a plurality of usable edges and interfering edges that run in an arch shape. The overall construction of the projection lens therefore consists of arch-shaped elements and/or arch-shaped and rectilinear elements that run in cross-section, wherein the elements respectively consist of a usable edge and an interfering edge. The first usable edges of the Fresnel lens are calculated for generation of the light distribution with a light/dark boundary closing off above it. Second usable edges are used to generate a second part of the light emitted by the light source (light beams) for detecting high-mounted traffic signs. Advantageously, a difference between the work angles of the first usable flank and the second usable flank is not detectable to an observer from the outside. On the other hand, the Fresnel lens can be produced simply by injection molding. Advantageously, the work angle of the resulting facets (second usable edges) is relatively small, so that the measure is technically easy to implement. According to the invention, the specified lighting levels for illuminating the overhead traffic signs are generated specifically in an upper half of the projection lens. The other surfaces, namely the first usable edges in the upper and in the lower half space, can be used for generation of the specified light distribution with a light/dark boundary.

According to a preferred embodiment of the invention, there is a transition area between one end of the second usable edges on the one hand and one end of a first usable edge or an interfering edge on the other hand, in which no contribution or only a small contribution is made for generation of the lighting levels for the overhead traffic signs. In the transition area, the second usable edge is configured in such a way that it approaches the surface or orientation of the first usable edge or interfering edge and does not cause any blinding, which is to say, does not emit any light in the immediate vicinity and above the light/dark boundary of the light distribution. Preferably, the transition area is relatively short so that the effectiveness of the second usable edge can be fully utilized over its length. On the other hand, the transition area must be long enough to prevent unwanted scattered radiation.

According to a preferred embodiment of the invention, the second usable edge merges continuously and/or continuously in the first derivation and/or continuously in second derivation in the transition area into the groove edge or into the interfering edge. In this way, targeted avoidance of blinding can be achieved.

According to a preferred embodiment of the invention, the transition area between the second usable edge and the first usable edge or interfering edge is arranged in an area close to a horizontal median plane of the Fresnel lens. In this embodiment, the second usable edge has a semicircular extension which extends approximately along 180° about an optical axis of the Fresnel lens. Alternatively, the extension angle can also be configured smaller if the number of arch-shaped second usable edges is increased. Preferably, the minimum extension angle of the second usable edge about the optical axis is 90° and is located in the upper half space of the Fresnel lens.

According to a further development of the invention, such a number of second usable edges that preferably run longitudinally in an arch shape or semicircularly is provided that the specified lighting levels for the overhead traffic signs are met. By way of example, a pair of second usable edges can extend in a relatively small radius and another pair of usable edges can extend in a relatively large radius about the optical axis.

According to a further development of the invention, the second usable edges are calculated to be aspherical in such a way that light striking them is deflected in the direction of the specified lighting location for illuminating overhead traffic signs, thereby achieving the specified lighting levels.

According to an alternative embodiment of the invention, the second usable edge is configured to be flat, without the light striking it vertically being deflected. The second usable flank is therefore configured to be window-like. In this embodiment, the second usable edges are arranged in such a way that the light (second part of the light beam) hitting them passes through virtually uninterrupted and the specified lighting levels for illuminating the overhead traffic signs are met. In this embodiment, the light is emitted outward from a focal plane of the Fresnel lens.

BRIEF DESCRIPTION OF THE DRAWINGS

One embodiment of the invention is elucidated in more detail below with reference to the drawings. Wherein:

FIG. 1 shows a front view of a Fresnel lens with first and second usable edges drawn in;

DETAILED DESCRIPTION OF THE CURRENT EMBODIMENTS

Figure 1:
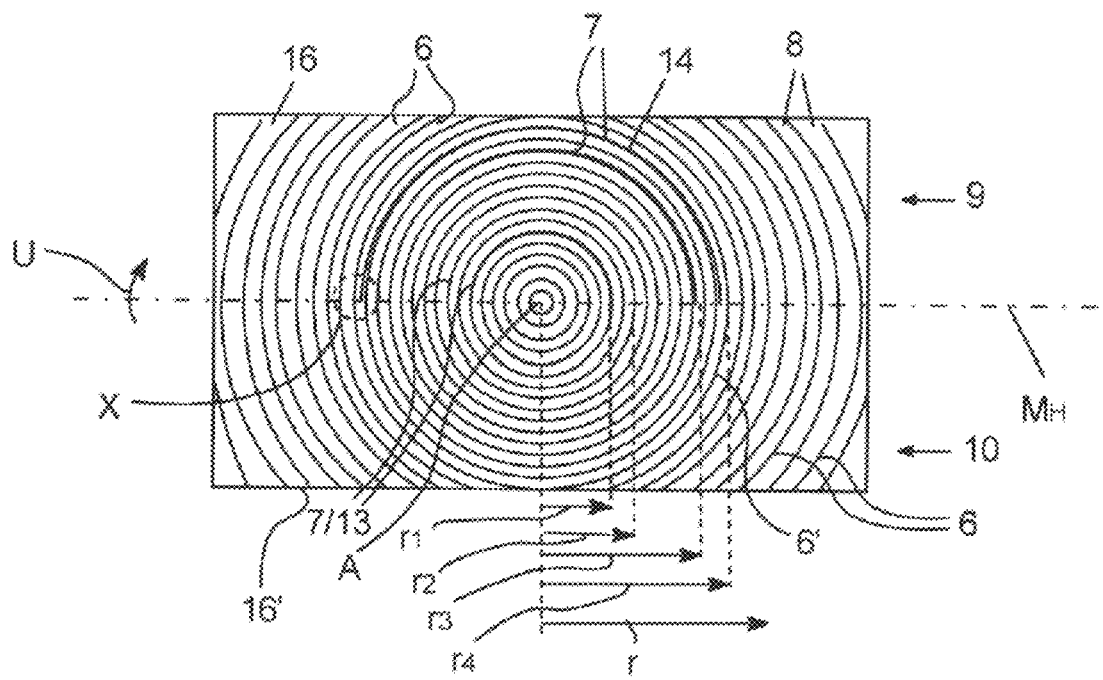

A headlamp for vehicles consists substantially of a light source 1 and an optical unit 2, so that a predetermined light distribution with a light/dark boundary HDG and lighting levels V can be generated for the detection of high-mounted traffic signs (overhead traffic signs). The light distribution is configured as a low beam light distribution AL.

The optical unit 2 comprises a Fresnel lens 3 as a projection lens, which has a flat light entry side 4 and on a light exit side 5 an annular or alternatively arch-shaped or alternatively part-circular first usable edges 6, second usable edges 7 and interfering edges 8. As can be seen from FIG. 1, a pair of second usable edges 7 is located in an upper half space of the Fresnel lens 3, which is to say, substantially above a horizontal center plane $M_H$ of the Fresnel lens 3.

The first usable edges 6 run both in the upper half space 9 of the Fresnel lens and in a lower half space 10 of the same Fresnel lens. The two half spaces 9 and 10 are separated from each other by the horizontal median plane $M_H$ of the Fresnel lens 3.

As in the case of the first usable edges 6, the interfering edges 8 likewise extend in an arch shape or alternatively circular shape about an optical axis A of the projection lens 3, and, namely between the neighboring first usable edges 6 running in the circumferential direction U or between the second usable edge 7 and a first usable edge 6 running offset transversely to the longitudinal extension of and parallel to the second usable edge 7. As can be seen, for example, from FIG. 4, the work angle of the interfering edges 8 is selected in such a way that a line lengthening the interfering edges 8 (see dashed line) meets in a focal plane $E_B$ and in a focal point on the optical axis A, which is located at a focal width f relative to the Fresnel lens 3.

Figure 3:
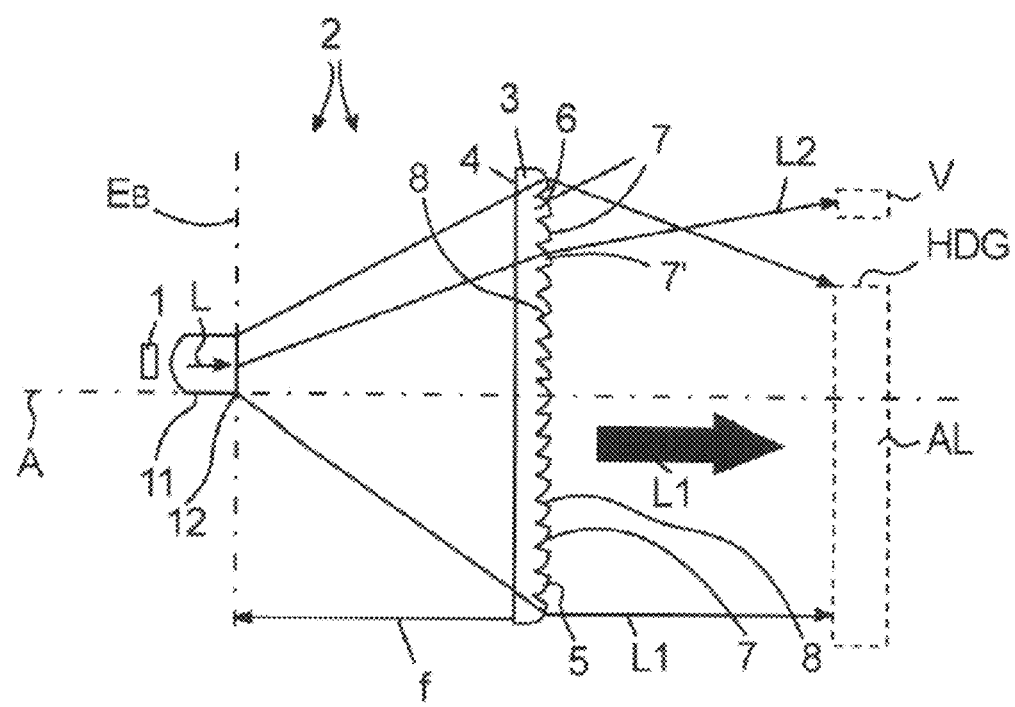
FIG. 3 is a schematic representation of a headlamp according to a first embodiment.

According to a first embodiment of the invention as shown in FIG. 3, the optical unit 2 additionally comprises a primary lens 11, which is arranged between the light source 1 and the Fresnel lens 3. The primary lens 11 can be configured as a light guide from which light L emerges and is collected in the focal plane $E_B$ of the Fresnel lens 3. Preferably, an aperture edge 12 is provided in the focal plane $E_B$ of the Fresnel lens 3, which is mapped to the light/dark boundary HDG of the low beam light distribution AL by means of the Fresnel lens 3. The aperture edge 12 is formed by a front edge of the primary lens 11.

The light source 1 is preferably configured as an LED light source.

The first usable edges 6 are calculated in such a way that a first part L1 of the light L hitting them is refracted in such a way that the specified light distribution or low beam light distribution AL is generated with the light/dark boundary HDG.

In the upper half space 9 (upper half area) of the Fresnel lens 3, a first pair 13 of second usable edges 7 is arranged with a radius $r_1$, $r_2$ as well as a second pair 14 of second usable edges 7 with a radius $r_3$, $r_4$, wherein the radii $r_3$, $r_4$ of the second pair 14 are considerably larger than the radii $r_1$, $r_2$ of the first pair 13 of second usable edges 7. This ensures that the required lighting levels for the detection of the high-positioned traffic sign at a given lighting location can be met. A number of two to five first usable edges 6 is arranged in an area between the second usable edges 7 of the first pair 13 on the one hand and the two usable edges 7 of the second pair 14. A number of five to fifteen first usable edges 6 is arranged between the first pair 13 and the second pair 14 of second usable edges 7.

Figure 2:
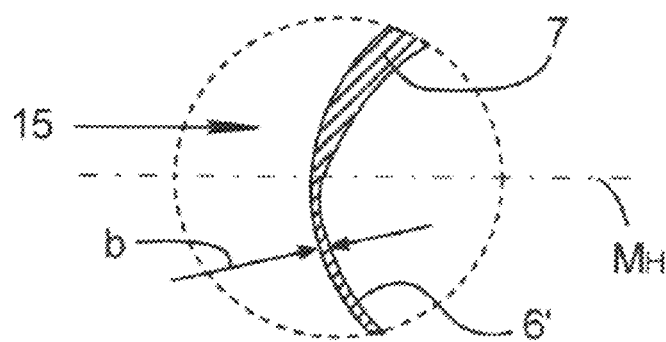
FIG. 2 shows an enlarged representation of a transition area X between a second usable edge and a first usable edge in the area of a horizontal median plane of the Fresnel lens.

In the present embodiment example, the second usable edges 7 respectively merge into a first usable edge 6 in a transition area 15, which extends in the vicinity of the horizontal median plane $M_H$ of the Fresnel lens 3. To this end, the second usable edges 7 taper in the direction of the horizontal median plane $M_H$ of the Fresnel lens 3 until they merge into the first usable edge 6. In FIG. 2, only a single second usable edge 7 is shown to simplify the illustration.

Preferably, the second usable edges 7 merge continuously and preferably continuously in the first derivation and preferably continuously in the second derivation into the first usable edge 6, so that no edges are created that could lead to unwanted blinding. Preferably, the second usable edge 7 in the transition area 15 is calculated in such a way that no unwanted blinding is generated, which is to say, no light L is mapped between the light/dark boundary HDG of the low beam light distribution AL and the traffic sign light distribution or alternatively lighting location V.

According to an alternative embodiment of the invention that is not shown, the second usable edge 7 can also merge into the interfering edge 8 in the transition area 15, which runs between the first usable edges 6.

FIG. 1 shows that, with the exception of the first usable edge 6', into which the second usable edge 7 merges in the transition area 15, all the first usable edges 6 in the upper half 9 and the lower half 10 run continuously with the same contour and the same radius r. The first usable edges 6 with a smaller radius run circularly, whereas the first usable edges 6 with a larger radius are cut off at an upper edge 16 and lower edge 16' of the Fresnel lens 3.

A width of the first usable edges 6, the second usable edges 7, and the interfering edges 8 is in the mm or cm range. By way of example, a width b of the first usable edge 6 or second usable edge 7 can be in a range between 0.5 mm and 1 mm. Preferably, a division between the first usable edges 6 and the second usable edges 7 is at least 0.5 mm.

According to the embodiment shown in FIG. 3, a front edge of the primary lens 11 is configured as the aperture edge 12 for generation of the light/dark boundary HDG of the low beam light distribution AL. In this case, a light exit side or alternatively the front edge of the primary lens 11 is preferably located in the focal plane $E_B$ of the Fresnel lens 3.

Figure 4:
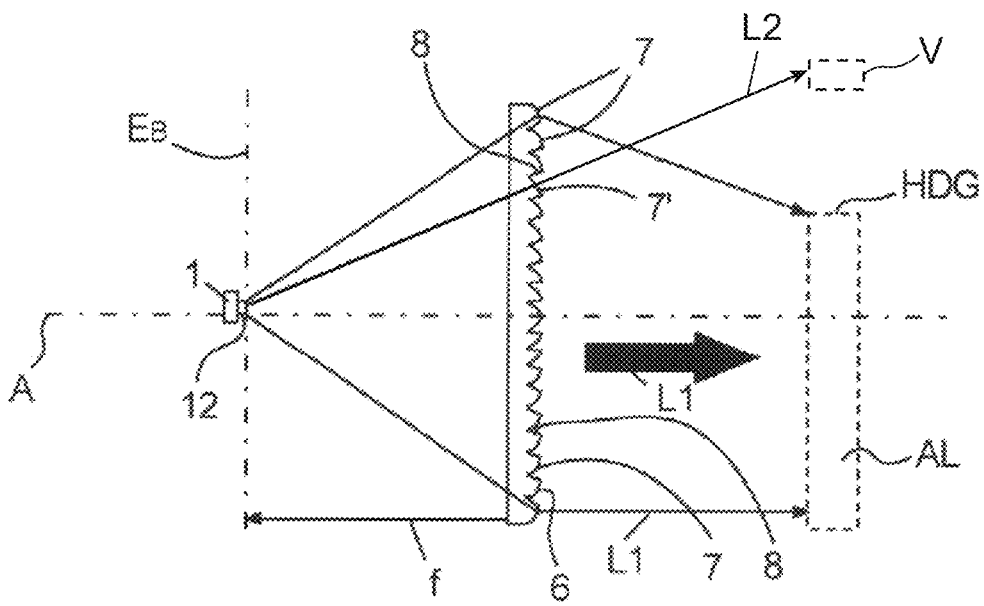
FIG. 4 is a schematic representation of a headlamp according to a second embodiment.

According to a further embodiment of the invention, as shown in FIG. 4, the optical unit 2 preferably comprises only the Fresnel lens 3. No primary lens is associated with the light source 1. The light source 1 can be arranged in the focal plane $E_B$ of the Fresnel lens 3, with a front edge of the light source 1 serving as an aperture edge for mapping the light/dark boundary HDG.

In this embodiment, second usable edges 7' are arranged in such a way that the second part L2 of the light L passes through without refraction and is used for generation of the lighting levels at the lighting locations V for detecting the overhead traffic signs. The second light portion L2 of the light L emitted by the light source 1 does therefore not experience any refraction. It is transmitted substantially in a straight line in the manner of a window with flat surfaces, wherein the second usable edge 7' comprises flat surfaces. The second usable edge 7' runs perpendicular to the second light component L2.

According to a further embodiment of the invention, a plurality of light sources and, if necessary, a plurality of primary lenses can also be provided in order to provide the required illuminance. If necessary, a plurality of light sources 1 can be provided for generation of the low beam light distribution AL and a plurality of light sources 1 can be provided for generation of a high beam light distribution, which distribution is in front of the same Fresnel lens 3.

LIST OF REFERENCE NUMERALS 1 light source
2 optical unit
3 Fresnel lens
4 light entry side
5 light exit side
6, 6' $1^{st}$ usable edges
7, 7' $2^{nd}$ usable edges
8 interfering edge
9 upper half space
10 lower half space
11 primary lens
12 aperture edge
13 $1^{st}$ part
14 $2^{nd}$ part
15 transition area
16, 16' upper/lower edge
$M_H$ median plane
L light beam
L1 $1^{st}$ part
L2 $2^{nd}$ part
HDG light/dark boundary
V lighting location
AL low beam light distribution
$E_B$ focal plane
b width
f focal width
r . . . $r_4$ radius
A axis
U peripheral direction The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A headlamp for vehicles comprising:
   a light source for emitting a light beam; and
   an optical unit containing a projection lens which deflects a first part of the light beam for generation of a light distribution with a light/dark boundary,
   wherein a second part of the light beam emitted by the light source is guided in an area above the light/dark boundary of the light distribution for detection of high-mounted traffic signs,
   wherein the projection lens is a Fresnel lens which comprises arch-shaped first usable edges in an upper half space and in a lower half space for deflection of the first part of the light beam, and which comprises a plurality of arch-shaped second usable edges exclusively in the upper half space for passage of the second part of the light beam therethrough, wherein the arch-shaped second usable edges extend along a portion of a circular arc when viewed in front elevation, and wherein the arch-shaped second usable edges are bordered on each side by respective ones of the arch-shaped first usable edges in the upper half space of the Fresnel lens.

2. The headlamp of claim 1, wherein the second usable edges respectively merge in a transition area into the first edge edges or into an interfering edge running adjacent to the first usable edges.

3. The headlamp of claim 2, wherein the transition area runs to above a horizontal median plane of the Fresnel lens or until directly up to the horizontal median plane of the Fresnel lens.

4. The headlamp of claim 2, wherein the second usable edges merge continuously into the first usable edges or into the interfering edge.

5. The headlamp of claim 2, wherein the interfering edge, which runs parallel to the first usable edges or alternatively the second usable edges, is connected to opposing longitudinal edges of the first usable edges and of the second usable edges.

6. The headlamp of claim 2, wherein the second usable edges taper in the transition area.

7. The headlamp of claim 2, wherein the second usable edges are configured in such a way that light beams impinging the transition area are deflected in a direction below the light/dark boundary.

8. The headlamp of claim 2, wherein the first usable edges and the second usable edges and the interfering edge are arranged on a light exit side of the Fresnel lens facing away from the light source.

9. The headlamp of claim 1, wherein a width of the first usable edges and the second usable edges is between 0.5 mm and 1.5 cm.

10. The headlamp of claim 1, wherein the second usable edge is aspherical such that the second part of the light beam is refracted in a direction of a predetermined lighting location above the light/dark boundary of the light distribution.

11. The headlamp of claim 1, wherein an aperture edge is formed by an edge of the light source or by an edge of a primary lens associated with the light source or by an edge of an additional aperture.

12. The headlamp of claim 1, wherein a light entry side of the Fresnel lens runs flat.

13. A headlamp for vehicles comprising:
a light source for emitting a light beam; and
an optical unit containing a projection lens which deflects a first part of the light beam for generation of a light distribution with a light/dark boundary;
wherein a second part of the light beam emitted by the light source is guided in an area above the light/dark boundary of the light distribution for detection of high-mounted traffic signs;
wherein the projection lens is a Fresnel lens which comprises arch-shaped first usable edges in an upper half space and in a lower half space for deflection of the first part of the light beam, and which comprises a plurality of arch-shaped second usable edges exclusively in the upper half space for passage of the second part of the light beam therethrough;
wherein the light source or an aperture edge associated with the light source is arranged in a focal plane of the Fresnel lens; and
wherein the second usable edges are arranged at a radius such that the second part of the light beam passes without refraction through the second usable edges to a lighting location above the light/dark boundary of the light distribution.

14. A headlamp for vehicles comprising:
a light source for emitting a light beam; and
an optical unit containing a projection lens which deflects a first part of the light beam for generation of a light distribution with a light/dark boundary;
wherein a second part of the light beam emitted by the light source is guided in an area above the light/dark boundary of the light distribution for detection of high-mounted traffic signs;
wherein the projection lens is a Fresnel lens which comprises arch-shaped first usable edges in an upper half space and in a lower half space for deflection of the first part of the light beam, and which comprises a plurality of arch-shaped second usable edges exclusively in the upper half space for passage of the second part of the light beam therethrough;
wherein the second usable edges run flat, such that the second part of the light beam strikes the second usable edges perpendicularly.

* * * * *